United States Patent
Sasaki et al.

[11] Patent Number: 5,480,713
[45] Date of Patent: Jan. 2, 1996

[54] MAGNETIC RECORDING MEDIUM

[75] Inventors: Kunitsuna Sasaki; Narito Goto; Katsuyuki Takeda; Nobuyuki Sekiguchi; Hideki Takahashi; Ryosuki Isobe; Takahiro Mori, all of Hino, Japan

[73] Assignee: Konica Corporation, Japan

[21] Appl. No.: 115,903

[22] Filed: Sep. 1, 1993

Related U.S. Application Data

[63] Continuation of Ser. No. 815,052, Dec. 27, 1991, abandoned.

[30] Foreign Application Priority Data

Dec. 28, 1990 [JP] Japan ................................. 2-417542
Apr. 12, 1991 [JP] Japan ................................. 3-108442

[51] Int. Cl.⁶ ................................. B32B 5/16; G11B 5/66
[52] U.S. Cl. ..................... 428/323; 428/329; 428/328; 428/336; 428/684 B; 428/694 BA; 428/394 BM; 428/900
[58] Field of Search ................................. 428/323, 336, 428/329, 328, 900, 694 B, 694 BA, 694 BM

[56] References Cited

U.S. PATENT DOCUMENTS

| | | | |
|---|---|---|---|
| 4,442,159 | 4/1984 | Dezawa et al. | 428/212 |
| 4,506,000 | 3/1985 | Kubota et al. | 430/39 |
| 4,624,894 | 11/1986 | Kishimoto | 428/328 |
| 4,851,289 | 7/1989 | Ogawa et al. | 428/329 |
| 4,911,997 | 3/1990 | Asai et al. | 428/329 |
| 5,051,303 | 9/1991 | Noguchi et al. | 428/329 |

OTHER PUBLICATIONS

Patent Abstracts of Japan, vol. 13, No. 16 (E–703); Jan 13, 1989 JPA–63–222,404; Sep. 16, 1988.

Patent Abstracts of Japan, vol. 14 No. 561 (P–1142); Dec. 13, 1990 JPA–2–240, 824; Dec. 13, 1990.

Patent Abstracts of Japan, vol. 14 No. 191 (p–1038); Apr. 18, 1990 JPA–2–35, 622; Feb. 6, 1990.

*Primary Examiner*—L. Kiliman
*Attorney, Agent, or Firm*—Jordan B. Bierman; Bierman and Muserlian

[57] ABSTRACT

A magnetic recording medium having an improved output property over the wide range of wavelength, by controlling the magnetic reluctance and saturated magnetic flux density of the outermost layer and at least one layer other than the outermost layer, as specified in the claims, is disclosed. A magnetic matal powder contained in the outermost layer has an average major axis length of not more than 250 nm and a ratio of the average major axis length divided by an average X-ray measured particle size is less than 12.

6 Claims, 2 Drawing Sheets

MAGNETIC RECORDING MEDIUM

This application is a continuation of application Ser. No. 07/815,052, filed Dec. 27, 1991, now abandoned.

FIELD OF THE INVENTION

This invention relates to a magnetic recording medium such as a magnetic tape, a magnetic sheet and a magnetic disk.

BACKGROUND OF THE INVENTION

A magnetic recording medium such as a magnetic tape is generally prepared by coating a magnetic paint comprising a magnetic powder and a binder resin over a support and then by drying the resulting coated support.

In recent years, for the purpose of improving the characteristics of a magnetic recording medium, it has been known to divide a magnetic layer into a plurality of layers and to contain a ferromagnetic metal powder in the outermost layer thereof and Co-γ-FeOx in the layers other than the outermost layer thereof. [Refer to Japanese Patent Publication Open to Public Inspection (hereinafter referred to as JP OPI Publication) No. 64-19524/1986.]

When containing Co-γ-FeOx in the layers other than the outermost layer as mentioned above, the RF output and lumi S/N thereof are equivalent to those of a magnetic layer comprising only a single layer containing ferromagnetic metal powder and the chroma output and chroma S/N thereof are further improved, as compared the above-mentioned two kinds of layers to each other, because Co-γ-FeOx is normally lower in Hc than that of ferromagnetic metal powder. In addition to the above, Co-γ-FeOx is more inexpensive than ferromagnetic metal powder, so that the production cost thereof may also be saved.

There is also a short-wave recording tendency in a recording system in which ferromagnetic metal powder is used, such as the recently developed Hi-Fi 8 mm video systems. Accordingly, in the ferromagnetic metal powder which is applicable to the outermost layer and contributable to a short-wave recording operation, it has become popular to use those having a substantially shorter average major axis length such as 0.25 μm (i.e., 250 nm) as seen in JP OPI Publication No. 64-19524/1989.

However, even in the technique disclosed in the above-given JP OPI Publication No. 64-19524/1989, the resulting electromagnetic conversion characteristics including, particularly, the RF output and lumi S/N have not been satisfactory.

SUMMARY OF THE INVENTION

It is an object of the invention to provide a magnetic recording medium satisfactory in electromagnetic characteristics throughout the whole wavelength region from the shortwave side to the longwave side and improved on the electromagnetic alignment property of the magnetic metal powder applied to the outermost layer so that the RF output and lumi S/N thereof can also be improved.

Figure 1:
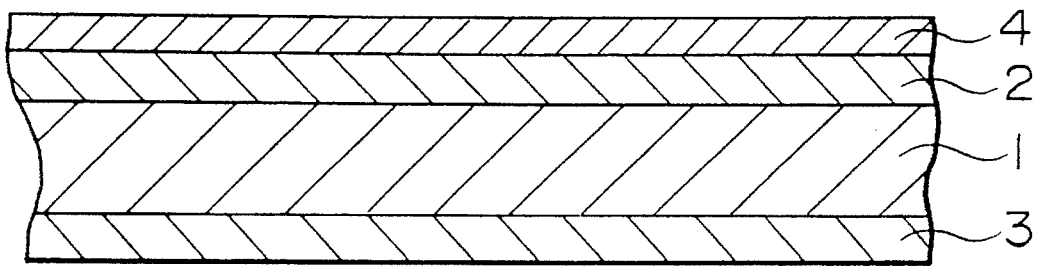
FIG. 1 is a cross-sectional view illustrating an example of multilayered magnetic tapes.

| Description of the refernce numerals: | |
| --- | --- |
| 1 | Support; |
| 2 | Magnetic layer (the lower layer) |
| 3 | Backcoat layer |
| 4, 6, | Magnetic layer (the upper layer) |
| 5 | Magnetic layer (intermediate) |

DETAILED DESCRIPTION OF THE INVENTION

In other words, the invention relates to a magnetic recording medium comprising a non-magnetic support provided with a plurality of magnetic layers laminated thereon, wherein the outermost layer out of the magnetic layers contains a magnetic metal powder having an average major axis length of shorter than 250 nm and the ratio of the average major axis length to an average crystallite size (the average major axis length/an average crystallite size) of less than 12.

The media of the invention are comprised of a plurality of magnetic layers as the magnetic layer thereof. It is, therefore, allowed to form each of the layers so that the high frequency recording and playback characteristics of video outputs, for example, can be made excellent on the outermost layer side and the relatively lower frequency recording and playback characteristics of chroma or audio outputs, for example, can also be made excellent on the lower layers' side. It is generally required to embody the above-mentioned constitution in the following manner. A coercive force (Hc) of the side whereto the outermost layer is arranged (including particularly the side of the outermost layer itself) is to be made greater than that of the lower layer side and the layer thickness of the outermost layer is to be substantially thin. It is also desirable that the layer thickness of the outermost layer is to be not thicker than 1 μm and, particularly, not thicker than 0.6 μm. It is further desirable that the layer thickness of the lower layer adjacent to the outermost layer is to be within the range of 1.5 to 4.0 μm.

JP OPI Publication No. 64-19524/1989 discloses that the average major axis length and average crystallite size each of the ferromagnetic metal powder applied to the outermost layer are to be shorter than 0.25 μm and smaller than 200 Å, respectively. However, when checking up the example of the ratio of the former to the latter, (i.e., the ratio of the average major axis length to the average crystallite size), it was found to be not less than 12.

This JP OPI Publication gives such a reasons that the magnetic alignment of magnetic particles is deteriorated in preparing a magnetic recording medium when the axis ratio of magnetic powder is getting lower.

However, as the results that the inventors have devoted themselves in studying seriously, it was proved that, when orientating a 3000 Gauss magnetic field (especially in a drying zone) after coating a magnetic paint, the longitudinal orientation of ferromagnetic metal powder cannot be deteriorated even when a ratio of (a longitudinal length/a crystallite size) is less than 12.

Further when ferromagnetic metal powder has a ratio of (a longitudinal length/a crystallite size), the orientation thereof in the vertical direction can be excellent, as compared to that of ferromagnetic metal powder having a ratio of (a longitudinal length/a crystallite size) of not less than 10.

A luminance signal is recorded in a short wavelength region. It is, therefore, desirable to record the surface layer portions of a medium such as a tape vertically. In this connection, when containing ferromagnetic metal powder having a ratio (of a major axis length/a crystallite size) of less than 12 and, particularly, less than 10 in the upper layer of a magnetic layer, the luminance-signal output and S/N thereof can be improved.

The average major axis length of the above-mentioned ferromagnetic metal powder is preferable to be less than 250 nm, because the modulation noise and so forth may become serious if the average major axis length thereof is not less than 250 nm.

In the invention, the above-mentioned term, 'an average major axis length', means an average value obtained when measuring the major axes of 100 pieces of magnetic powder particles through a transmission type electron microscope. The above-mentioned term, 'an average crystallite size', means an average value obtained by measuring 100 pieces of particles in the (110) direction in an X-ray diffraction method, and the average value thereby obtained corresponds to the average value of the minor axes of the same particles.

The above-mentioned average major axis length and average crystallite size may be obtained by controlling the preparation conditions (including, for example, a reduction time) which are to be applied when metal magnetic powder are to be prepared.

From the viewpoints of saving the costs and preparing a magnetic paint, it is desirable for the media of the invention that at least one layer of the lower magnetic layers of a medium contains cobalt and magnetic powder comprising iron oxide represented by FeOx (in which a relation of 1.33<x≦1.5 is to be effective).

In the invention, a plurality of layers each constituting a magnetic layer are desirable to be adjacent to each other, provided, there may be some instances where an apparent boundary having a specific thickness may substantially be made present between each of the above-mentioned layers so that both of the magnetic powder of the two layers may be mixed together and, in this instance, the above-mentioned each of the layers is to be regarded as the upper or lower layer from which the above-mentioned boundaries are excluded.

The media of the invention are particularly suitable for the case where each magnetic layer is coated in a simultaneously multilayered wet-on-wet coating method. It is the matter of course to apply a wet-on dry method in which the upper layer is to be coated after the lower layer is dried up.

As shown in FIG. 1, for example, the magnetic recording media of the invention are each prepared by laminating the first magnetic layer 2 and the second magnetic layer 4 in this order over a non-magnetic support 1 such as that comprising polyethylene. In addition to the above, a backcoat layer 3 is provided over to the support surface opposite to the support surface laminated with the layers 2 and 4, however, the backcoat layer 3 may not necessarily be provided thereonto. It is also allowed to provide an overcoat layer over to the second magnetic layer 4. In the example shown in FIG. 2, the upper layer was divided into two layers 5 and 6.

Figure 2:
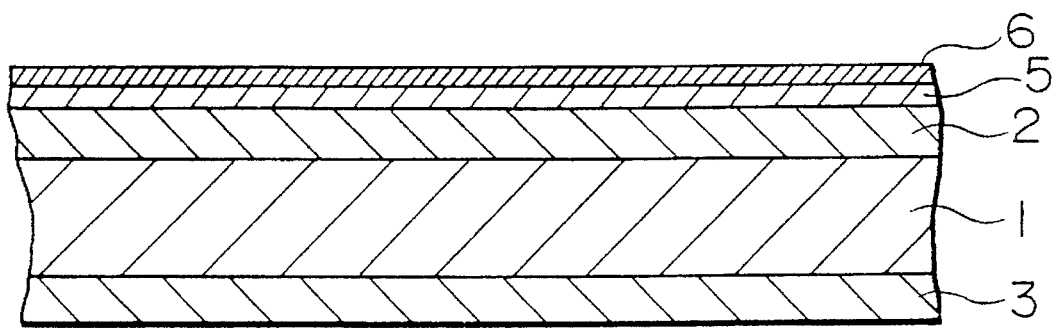
FIG. 2 shows another example of the magnetic recording media.

In the magnetic recording media shown each in FIGS. 1 and 2, it is preferable that the first magnetic layer 2 is to have a thickness within the range of 1.5 to 4.0 μm and that the second magnetic layer or both of the second and third magnetic layers 5 and 6 are to have a total thickness of not thinner than 0.1 μm (e.g., 0.3 μm). In the outermost magnetic layers 4 and 6 and the other magnetic layers 2 and 5 (and/or 2), the former layers are to be regarded as the outermost layer and the latter layers 2 and 5 or 5 and 2, as the lower layers, according to the invention.

Among the above-mentioned magnetic layers 2, 4, 5 and 6, layers 4 and 6 (and, additionally, 5) each contain the foregoing magnetic metal powder relating to the invention (having an average major axis length of less than 250 nm and an average major axis length/an average crystallite size ratio< 12).

The above-mentioned magnetic metal powder include, for example, ferromagnetic powder of Fe, Ni or Co and, in addition, magnetic metal powder mainly comprising Fe, Ni and/or Co, such as those of Fe-Al type, Fe-Al-Ca type, Fe-Al-Ni type, Fe-Al-Zn type, Fe-Al-Co type, Fe-Ni type, Fe-Ni-Al type, Fe-Ni-Co type, Fe-Ni-Si-Al-Mn type, Fe-Ni-Si-Al-Zn type, Fe-Al-Si type, Fe-Ni-Zn type, Fe-Ni-Mn type, Fe-Ni-Si type, Fe-Mn-Zn type, Fe-Co-Ni-P type and Co-Ni type. It is also allowed that the above-given magnetic metal powder contain the elements such as Cu and Cr and the compounds thereof as the additives.

Among the above-given magnetic metal powder, Fe type metal powder is excellent in electric characteristics and the following Fe type magnetic powder is particularly preferable in antiabrasion and dispersion properties; namely, those of Fe-Al type, Fe-Al-Ca type, Fe-Al-Ni type, Fe-Al-Zn type, Fe-Al-Co type, Fe-Ni type, Fe-Ni-Al type, Fe-Ni-Zn type, Fe-Ni-Al-Si-Zn type, Fe-Ni-Al-Si-Mn type and Fe-Ni-Co type.

In addition, the preferable ferromagnetic metal powder mentioned above are to have such a structure that a proportion of Fe atoms to Al atoms each contained in the ferromagnetic metal powder is to be Fe:Al=100:1 to 100:20 in terms of the atom number ratio, and that a proportion of Fe atoms to Al atoms each made present on the surface region having an analytical depth of not deeper than 100Å measured in ESCA of the ferromagnetic metal powder is to be Fe:Al=30:70 to 70:30 in terms of atom number ratio. Or, the other preferable ferromagnetic metal powder are to have the following structure. Fe atom, Ni atom, Al atom and Si atom are contained therein Another preferable ferromagnetic metal powder has the structure that Fe atom, Ni atom, Al atom and Si atom are contained therein, that at least either one of Zn atom and Mn atom is also contained therein, that the Fe atom content thereof is not less than 90 atom %, the Ni atom content thereof is within the range of not less than 1 atom % to less than 10 atom % the Al atom content thereof is within the range of not less than 0.1 atom % to less than 5 atom %, the Si atom content thereof is within the range of not less than 0.1 atom % to less than 5 atom % and the Zn atom content thereof and/or the Mn atom content thereof are within the range of not less than 0.1 atom % to less than 5 atom % (provided, the contents thereof means the total contents thereof when both of the Zn and Mn atoms are contained therein.) and that a proportion among the Fe atom, Ni atom, Al atom, Si atom, Zn atom and/or Mn atom each made present in the surface region of the ferromagnetic metal powder having an analytical depth of not deeper than 100Å measured in ESCA of the ferromagnetic metal powder is Fe:Ni:Al:Si (Zn and/or Mn)=100:(not more than 4):(10 to 60):(10 to 70):(20 to 80).

The examples of the magnetic powder applicable to the above-mentioned magnetic layer 2 or 5 include a magnetic oxide such as α-Fe$_2$O$_3$, Co-containing γ-Fe$_2$O$_3$, Co-adhered γ-Fe$_2$O$_3$, Fe$_3$O$_4$, Co-containing Fe$_3$O$_4$, Co-adhered Fe$_3$O$_4$, Co-containing magnetic FeOx (in which 1.33>x≧1.5) and CrO$_2$, a hexagonal ferrite such as barium ferrite and iron nitride. Among the magnetic powder given above, Co-containing FeOx (in which 1.33 >x≧1.5) is preferable.

Each of the magnetic layers is also allowed to contain a dispersant (such as powdered lecithin), a lubricant [such as silicone oil, graphite, molybdenum disulfide, tungsten disulfide, a monobasic aliphatic acid having 12 to 20 carbon atoms (such as stearic acid) and an aliphatic acid ester having 13 to 40 carbon atoms], an abrasive (such as alumina) and an antistatic agent (such as carbon black and graphite).

The binders applicable to a magnetic layer such as those 2, 4, 5 and 6 include, preferably, the binders each having an average molecular weight within the range of 10000 to 200000. They may be exemplified by, for example, a vinyl chloride-vinyl acetate copolymer, a vinyl chloride-vinylidene chloride copolymer, a vinyl chloride-acrylonitrile copolymer, polyvinyl chloride, urethane resin, a butadiene-acrylonitrile copolymer, polyamide resin, polyvinyl butylal, a cellulose derivative (such as cellulose acetate butylate and cellulose diacetate), a styrene-butadiene copolymer, polyester resin, various kinds of synthetic rubbers, phenol resin, epoxy resin, urea resin, melamine resin, phenoxy resin, silicone resin, an acrylic type reactive resin, a mixture of a high molecular weight polyester resin and an isocyanate prepolymer, a mixture of a polyester polyol and a polyisocyanate, urea formaldehyde resin, a mixture of a low molecular weight glycol/a high molecular weight diol/an isocynanate, and the mixtures thereof.

The above-given binders may preferably be a resin containing such a hydrophilic polar group as —$SO_3M$, —COOM and —$PO(OM')_2$, (in which M represents a hydrogen atom or an alkali metal such as lithium, potassium and sodium, and M' represents a hydrogen atom, an alkali metal such as lithium, potassium and sodium, or a hydrocarbon residual group). To be more concrete, the above-mentioned resins are improved in the affinity to magnetic powder by the above-mentioned intramolecular polar group. The improved affinity can further improve the dispersibility of the magnetic powder and any magnetic powder can be prevented from cohering together, so that the stability of a coating solution can further be improved and in its turn the durability of a medium can also be improved.

The above-mentioned binders including particularly a vinyl chloride type copolymer can be prepared by copolymerizing a vinyl chloride monomer, a copolymerizable monomer containing the alkali salt of sulfonic acid or phosphoric acid and, if required, other copolymerizable monomers. The above-mentioned copolymers can be vinyl-synthesized, therefore, they can readily be synthesized. The optimum characteristics thereof can also be controlled, because various copolymer components can freely be selected.

When providing backcoat layer 3 to a medium, non-magnetic particles such as those of barium sulfate are contained in the above-mentioned binder and they are coated over the rear surface of the support of the medium.

The materials applicable to the above-mentioned support 1 include, for example, plastics such as polyethylene terephthalate and polypropylene, metals such as Al and Zn, glass, BN, Si-carbide, and ceramics such as porcelain and earthware.

Figure 3:
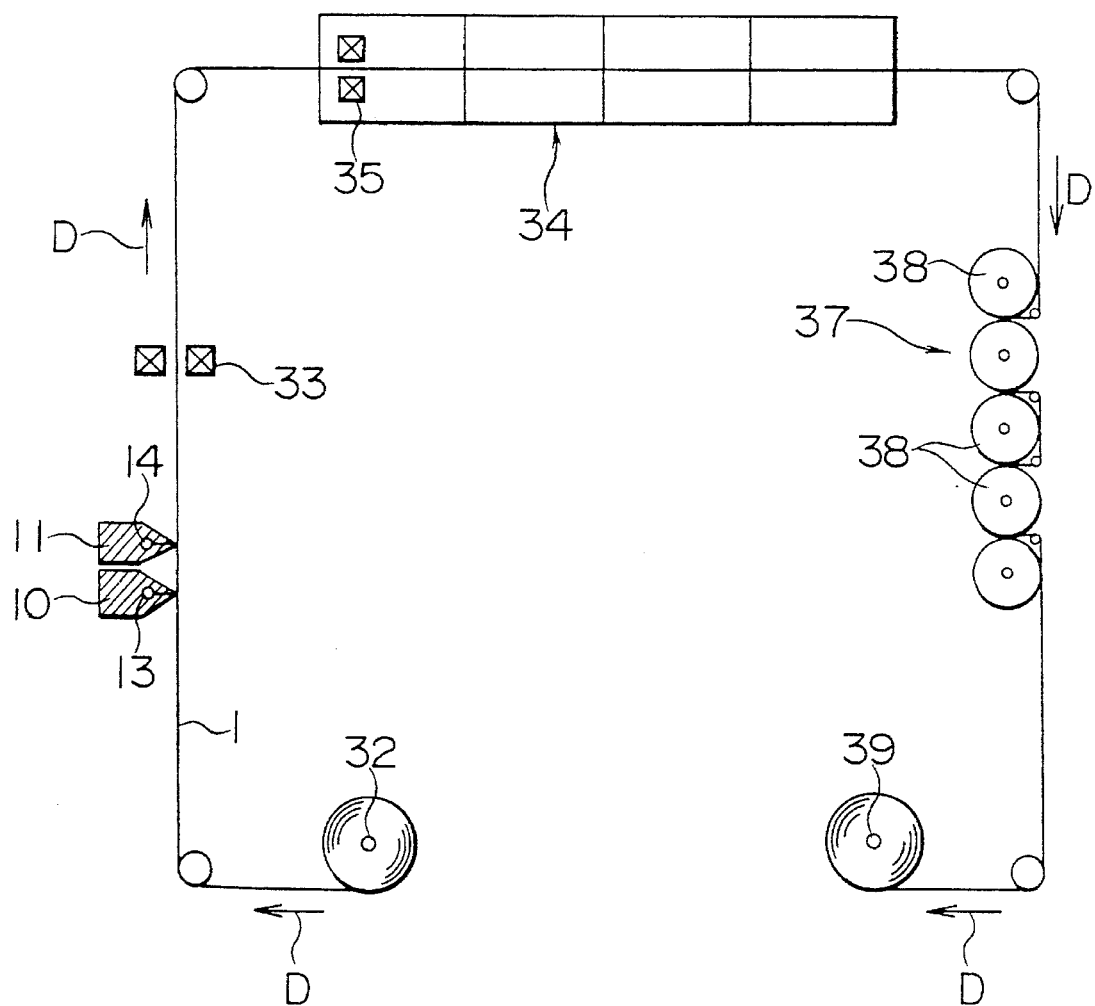
FIG. 3 shows an example of the apparatuses for preparing magnetic recording media.

An example of the apparatuses for preparing the above-described media is shown in FIG. 3.

When preparing the medium shown in FIG. 1 in this exemplified apparatus, film-shaped support 1 having drawn out of supply roll 22 is coated with each of the paints for the above-mentioned magnetic layers 2 and 4 by making use of extrusion coaters 10 and 11. After that, the coated support 1 is oriented by fore-staged orientation magnets 33 having 2000 Gauss for example and is then introduced into dryer 34 arranged with back-staged orientation magnets 35 having 2000 Gauss for example, so that the support is dried up by blowing hot air from a pair of nozzles arranged to the upper and lower sides of the dryer 34.

Next, the dried support 1 coated thereon with each of the magnetic layers is introduced into super-calender apparatus 37 comprising a combination of calendering rolls 38 and is then calendered there. After that, the calendered support 1 is taken up round take-up roll 39. It is allowed that each of the paints may be supplied to extrusion coaters 10 and 11 through an in-line mixer not shown. In the figure, arrow mark D indicates the direction of transporting a non-magnetic base-film.

Extrusion coaters 10 and 11 are each provided with liquid reservoirs 13 and 14 and the paints are superposed from each of the coaters in a wet-on-wet method. A medium shown in FIG. 2 may be prepared by adding a further extrusion coater as shown in FIG. 3.

EXAMPLES

The preferable examples of the invention will now be detailed.

The components, proportions or rates and operational orders given below can variously be changed, provided any embodiments shall not depart from the spirit or essential characteristics of the invention Further, in the following examples, the term, 'a part' or 'parts', means 'a part' or 'parts' by weight.

EXAMPLE 1

A magnetic paint for the upper layer was prepared by kneading and dispersing the following magnetic composition for the upper layer use.

| <Magnetic composition for the upper layer use> | |
|---|---|
| Fe—Al type magnetic metal powder, (having an average major axis length: 220 nm, an X-ray measured particle size (in an average crystallite size: 20 nm) and (Hc: 1600 Oe, δs: 120 emu/g) | 100 parts |
| Vinyl chloride resin containing potassium sulfonate, (MR-110 manufactured by Nippon Zeon Co.) | 10 parts |
| Polyurethane containing sodium sulfonate, (UR-8700 manufactured by Toyobo Corp.) | 5 parts |
| Alumina (having an average particle size: 0.6 μm) | 5 parts |
| Carbon black (having an average particle size: 30 mμ) | 1 part |
| Myristic acid | 1 part |
| Stearic acid | 1 part |
| Butyl stearate | 1 part |
| Cyclohexanone | 100 parts |
| Methyl ethyl ketone | 100 parts |
| Toluene | 100 parts |

<Magnetic Composition for the Lower Layer Use>

A magnetic paint for the lower layer use was prepared in the same manner as in the above-described magnetic composition for the upper layer use, so as to have the same composition as that of the above-described magnetic composition for the upper layer use, except that Co-γ-$Fe_2O_3$ (having an Hc of 800 Oe and an average major axis length of 300 nm) was used in place of the above-mentioned ferromagnetic metal powder.

Then, a magnetic layer comprising the lower layer having a layer thickness of 2.7 μm and the upper layer having a layer thickness of 0.3 μm was formed in the following manner. The resulting magnetic paints for the lower layer and for the upper layer were each added therein with 3 parts of polyisocyanate (Colonate-L manufactured by Japan Urethane Co.) and each of the resulting lower layer paint and upper layer paint were coated in this order over a 7.5 μm-thick polyethyleneterephthalate film support in the wet-on-wet method shown in FIG. 3. Next, the magnetic field of the resulting coated support was oriented at 3000 Gauss while the coated layer remained undried. After it was dried, it was surface-smoothened with a calender, so that the magnetic layer could be prepared.

Further, a 0.8 μm-thick backcoat layer was formed thereon by coating a backcoat layer paint having the following composition onto the above-mentioned polyethyleneterephthalate film surface opposite to the magnetic layer.

| <Composition of the paint for the backcoat layer use> | |
|---|---|
| Carbon black (Raven 1035) | 40 parts |
| Barium sulfate (having an average particle size of 300 μm) | 10 parts |
| Nitrocellulose | 25 parts |
| Polyurethane | 25 parts |
| Polyisocyanate | 10 parts |
| Cyclohexanone | 400 parts |
| Methyl ethyl ketone | 250 parts |
| Toluene | 250 parts |

After curing the resulting master roll at 60° C., it was slit apart into 8 mm video-tapes.

EXAMPLE 2–15 and COMPARATIVE EXAMPLES 1–12

Video tapes were each prepared in the same manner as in the above-given example 1, except that the characteristics of the ferromagnetic metal powder contained in the magnetic compositions for the upper layer, the thicknesses of the upper and lower layers and the orientation intensities of the magnetic field were each changed as shown in Tables 1 and 2, provided, comparative examples 9 and 10 each show the cases where no lower magnetic layers were provided, comparative example 11 show the case where no upper magnetic layer was provided and comparative example 12 show the case where Co-γ-Fe $_2$O$_3$ was used for the magnetic powder contained in the upper magnetic layer.

The characteristics of the resulting video tapes were measured in the following manner. The results thereof are shown in Table 1.

Sqx (Longitudinal squareness ratio):

A ratio of a residual magnetic flux density to a saturated magnetic flux density in the longitudinal direction of a subject tape (without any correction), which was measured by a VSM (Model VSM-3S manufactured by Toei Industrial Co.)

Sqz (Vertical squareness ratio):

A ratio of a residual magnetic flux density to a saturated magnetic flux density in the vertical direction of a subject tape (without any correction), which was measured by a VSM.

TABLE 1

| | Ferromagnetic metal powder of the upper layer | | | | | | |
|---|---|---|---|---|---|---|---|
| No. | Composition | Hc (Oe) | σs (emu/g) | Average major axis length (nm) | Average crystallite size (nm) | Ratio of [Average major axis length (nm)/Average crystallite size (nm)] | Upper layer thickness (μm) |
| Example-1 | Fe—Al | 1600 | 120 | 220 | 20 | 11.0 | 0.3 |
| Example-2 | Fe—Al | 1600 | 120 | 220 | 20 | 11.0 | 0.8 |
| Example-3 | Fe—Al | 1600 | 120 | 220 | 25 | 8.8 | 0.3 |
| Example-4 | Fe—Al | 1600 | 120 | 220 | 25 | 8.8 | 0.8 |
| Example-5 | Fe—Al | 1600 | 120 | 185 | 17 | 10.9 | 0.3 |
| Example-6 | Fe—Al | 1600 | 120 | 185 | 17 | 10.9 | 0.8 |
| Example-7 | Fe—Al | 1600 | 120 | 245 | 21 | 11.7 | 0.3 |
| Example-8 | Fe—Al | 1600 | 120 | 245 | 21 | 11.7 | 0.8 |
| Example-9 | Fe—Al | 1800 | 122 | 220 | 20 | 11.0 | 0.3 |
| Example-10 | Fe—Al | 1800 | 122 | 220 | 20 | 11.0 | 0.8 |
| Example-11 | Fe—Al | 1800 | 122 | 220 | 20 | 11.0 | 1.1 |
| Example-12 | Fe—Al | 1600 | 122 | 220 | 20 | 11.0 | 1.5 |
| Example-13 | Fe—Al | 1600 | 122 | 220 | 20 | 11.0 | 0.3 |
| Example-14 | Fe—Zn—Ni | 1600 | 122 | 220 | 20 | 11.0 | 0.3 |
| Example-15 | Fe—Zn—Ni | 1600 | 122 | 220 | 20 | 11.0 | 0.8 |

| No. | Lower layer thickness (μm) | Orientation magnetic field (Gauss) | Sqx | Sqz | RF output (dB) | Lumi S/N (dB) | Chroma output (dB) | Chroma S/N (dB) |
|---|---|---|---|---|---|---|---|---|
| Example-1 | 2.7 | 3000 | 0.87 | 0.22 | 1.9 | 1.7 | 0.1 | 0.1 |
| Example-2 | 2.2 | 3000 | 0.88 | 0.21 | 1.5 | 1.4 | −0.2 | −0.1 |
| Example-3 | 2.7 | 3000 | 0.87 | 0.25 | 1.8 | 1.6 | 0.2 | 0.1 |
| Example-4 | 2.2 | 3000 | 0.87 | 0.24 | 1.4 | 1.3 | 0 | 0.1 |
| Example-5 | 2.7 | 3000 | 0.86 | 0.21 | 1.8 | 1.6 | 0.1 | 0.2 |
| Example-6 | 2.2 | 3000 | 0.86 | 0.22 | 1.5 | 1.4 | 0 | −0.1 |
| Example-7 | 2.7 | 3000 | 0.88 | 0.21 | 1.9 | 1.7 | 0.2 | 0 |

TABLE 1-continued

| | | | | | | | | |
|---|---|---|---|---|---|---|---|---|
| Example-8 | 2.2 | 3000 | 0.87 | 0.21 | 1.4 | 1.3 | −0.1 | −0.2 |
| Example-9 | 2.7 | 3000 | 0.88 | 0.22 | 1.8 | 1.6 | 0.3 | 0.2 |
| Example-10 | 2.2 | 3000 | 0.87 | 0.22 | 1.4 | 1.3 | 0 | 0 |
| Example-11 | 1.9 | 3000 | 0.88 | 0.21 | 1.4 | 1.3 | −0.4 | −0.3 |
| Example-12 | 1.5 | 3000 | 0.88 | 0.21 | 1.3 | 1.2 | −0.5 | −0.4 |
| Example-13 | 2.7 | 2500 | 0.74 | 0.14 | 0.5 | 0.5 | −0.2 | −0.1 |
| Example-14 | 2.7 | 2500 | 0.87 | 0.21 | 1.8 | 1.6 | 0.2 | 0 |
| Example-15 | 2.2 | 2500 | 0.87 | 0.22 | 1.5 | 1.4 | −0.1 | 0.1 |

TABLE 2

| | Ferromagnetic metal powder of the upper layer | | | | | | |
|---|---|---|---|---|---|---|---|
| No. | Composition | Hc (Oe) | σs (emu/g) | Average major axis length (nm) | Average crystallite size (nm) | Ratio of [Average major axis length (nm)/Average crystallite size (nm)] | Upper layer thickness (μm) |
| Comparative example-1 | Fe—Al | 1600 | 120 | 220 | 18 | 12.2 | 0.3 |
| Comparative example-2 | Fe—Al | 1600 | 120 | 220 | 18 | 12.2 | 0.8 |
| Comparative example-3 | Fe—Al | 1600 | 120 | 250 | 21.9 | 11.4 | 0.3 |
| Comparative example-4 | Fe—Al | 1600 | 120 | 250 | 21.9 | 11.4 | 0.8 |
| Comparative example-5 | Fe—Al | 1600 | 120 | 240 | 21.9 | 12.0 | 0.3 |
| Comparative example-6 | Fe—Al | 1600 | 120 | 255 | 25 | 10.2 | 0.3 |
| Comparative example-7 | Fe—Zn—Ni | 1600 | 122 | 220 | 18 | 12.2 | 0.3 |
| Comparative example-8 | Fe—Zn—Ni | 1600 | 122 | 220 | 18 | 12.2 | 0.8 |
| Comparative example-9 | Fe—Al | 1600 | 120 | 220 | 20 | 11.0 | 3.0 |
| Comparative example-10 | Fe—Zn—Ni | 1600 | 122 | 220 | 20 | 11.0 | 3.0 |
| Comparative example-11 | — | — | — | — | — | — | — |
| Comparative example-12 | Co-γ-Fe$_2$O$_3$ | 1000 | 80 | 220 | 20 | 11.0 | 0.3 |

| No. | Lower layer thickness (μm) | Orientation magnetic field (Gauss) | Sqx | Sqz | RF output (dB) | Lumi S/N (dB) | Chroma output (dB) | Chroma S/N (dB) |
|---|---|---|---|---|---|---|---|---|
| Comparative example-1 | 2.7 | 3000 | 0.87 | 0.15 | 0 | 0 | 0 | 0 |
| Comparative example-2 | 2.2 | 3000 | 0.88 | 0.14 | 0.1 | 0.1 | −0.3 | −0.2 |
| Comparative example-3 | 2.7 | 3000 | 0.87 | 0.22 | −0.5 | −0.4 | 0 | 0.1 |
| Comparative example-4 | 2.2 | 3000 | 0.86 | 0.21 | −0.5 | −0.5 | −0.1 | 0 |
| Comparative example-5 | 2.7 | 3000 | 0.87 | 0.16 | −0.4 | −0.5 | 0 | −0.1 |
| Comparative example-6 | 2.7 | 3000 | 0.86 | 0.21 | −0.5 | −0.6 | −0.2 | 0 |
| Comparative example-7 | 2.7 | 3000 | 0.87 | 0.22 | 0 | 0 | 0.2 | 0.1 |
| Comparative example-8 | 2.2 | 3000 | 0.87 | 0.21 | −0.1 | −0.1 | −0.2 | −0.2 |
| Comparative example-9 | — | 3000 | 0.88 | 0.19 | 1.2 | 1.1 | −2.2 | −1.8 |
| Comparative example-10 | — | 3000 | 0.87 | 0.19 | 1.1 | 1.0 | −2.5 | −2.1 |
| Comparative example-11 | 3.0 | 3000 | 0.85 | 0.12 | −7.5 | −6.8 | 0 | 0 |
| Comparative example-12 | 2.7 | 3000 | 0.68 | 0.09 | −15.0 | −18.0 | −0.4 | −0.6 |

TABLE 3

| No. | Ferromagnetic metal powder of the upper layer | | | | | | |
|---|---|---|---|---|---|---|---|
| | Composition | Hc (Oe) | σs (emu/g) | Average major axis length (nm) | Average crystallite size (nm) | Ratio of [Average major axis length (nm)/Average crystallite size (nm)] | Upper layer thickness (μm) |
| Example-16 | Fe—Al | 1600 | 120 | 220 | 20 | 11.0 | 0.3 |
| Example-17 | Fe—Al | 1600 | 120 | 220 | 20 | 11.0 | 0.8 |
| Example-18 | Fe—Al | 1600 | 120 | 220 | 25 | 8.8 | 0.3 |
| Example-19 | Fe—Al | 1600 | 120 | 220 | 25 | 8.8 | 0.8 |
| Comparative example-13 | Fe—Al | 1600 | 120 | 220 | 18 | 12.2 | 0.3 |
| Comparative example-14 | Fe—Al | 1600 | 120 | 220 | 18 | 12.2 | 0.8 |
| Comparative example-15 | Fe—Al | 1600 | 120 | 255 | 25 | 10.2 | 0.3 |

| No. | Lower layer thickness (μm) | Orientation magnetic field (Gauss) | Sqx | Sqz | RF output (dB) | Lumi S/N (dB) | Chroma output (dB) | Chroma S/N (dB) |
|---|---|---|---|---|---|---|---|---|
| Example-16 | 0.3 | 2.4 | 3000 | 0.87 | 0.21 | 1.8 | 1.8 | 0 | 0.1 |
| Example-17 | 0.3 | 1.9 | 3000 | 0.87 | 0.22 | 1.6 | 1.4 | 0.1 | 0 |
| Example-18 | 0.3 | 2.4 | 3000 | 0.88 | 0.24 | 1.8 | 1.6 | 0.1 | 0 |
| Example-19 | 0.3 | 1.9 | 3000 | 0.87 | 0.25 | 1.5 | 1.4 | 0.1 | 0.2 |
| Comparative example-13 | 0.3 | 2.4 | 3000 | 0.86 | 0.14 | 0 | −0.1 | −0.2 | −0.1 |
| Comparative example-14 | 0.3 | 1.9 | 3000 | 0.87 | 0.15 | 0.1 | 0 | 0.1 | 0 |
| Comparative example-15 | 0.3 | 2.4 | 3000 | 0.86 | 0.22 | −0.4 | −0.5 | 0 | −0.1 |

What is claimed is:

1. A magnetic recording medium comprising:

a non magnetic support having provided thereon a plurality of layers including an outermost layer having a maximum thickness of 1 μm, said outermost layer containing a binder and a magnetic metal Fe-Al powder having a maximum major axis length of less than 250 nm, and a ratio of an average major axis length to an average X-ray measured particle size of less than 12.

2. The magnetic recording medium of claim 1 wherein at least one layer other than the outermost layer comprises a magnetic powder containing Cobalt and $FeO_x$ satisfying an equation of $1.33 < X \leq 1.5$.

3. The magnetic recording medium of claim 1, wherein said ratio is less than 10.

4. The magnetic recording medium of claim 2 wherein a coersive force of the outermost layer is more than 1600 Oe.

5. The magnetic recording medium of claim 4 wherein the coersive force of the outermost layer is more than 1700 Oe.

6. The magnetic recording medium of claim 5 wherein the coersive force of the outermost layer is more than 1700 Oe and not more than 2200 Oe.

* * * * *